United States Patent
Tani et al.

(10) Patent No.: US 9,156,467 B2
(45) Date of Patent: Oct. 13, 2015

(54) VEHICLE POWER GENERATING DEVICE AND POWER GENERATION CONTROL METHOD

(71) Applicants: Hideaki Tani, Chiyoda-ku (JP); Takeru Okabe, Chiyoda-ku (JP); Satoshi Wachi, Chiyoda-ku (JP)

(72) Inventors: Hideaki Tani, Chiyoda-ku (JP); Takeru Okabe, Chiyoda-ku (JP); Satoshi Wachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 13/849,086

(22) Filed: Mar. 22, 2013

(65) Prior Publication Data

US 2014/0114517 A1 Apr. 24, 2014

(30) Foreign Application Priority Data

Oct. 24, 2012 (JP) .................. 2012-234855

(51) Int. Cl.
- B60W 20/00 (2006.01)
- B60W 10/06 (2006.01)
- B60W 10/26 (2006.01)
- H02J 7/00 (2006.01)

(52) U.S. Cl.
CPC ............ *B60W 20/106* (2013.01); *B60W 10/06* (2013.01); *B60W 10/26* (2013.01); *H02J 7/007* (2013.01); *B60L 2240/547* (2013.01); *B60W 2510/244* (2013.01); *B60W 2510/246* (2013.01); *B60Y 2400/3086* (2013.01); *Y10S 903/903* (2013.01)

(58) Field of Classification Search
CPC ............. B60W 20/106; Y10S 903/903; Y10S 903/905; Y10S 903/906
USPC .......................................... 701/22; 903/903
See application file for complete search history.

(56) References Cited

U.S. PATENT DOCUMENTS

2012/0232736 A1* 9/2012 Aoki ............................... 701/22

FOREIGN PATENT DOCUMENTS

| JP | 61-177129 A | 8/1986 |
| JP | 2000-192830 A | 7/2000 |
| JP | 2007-223471 A | 9/2007 |
| JP | 2007-239528 A | 9/2007 |
| JP | 4158615 B2 | 10/2008 |
| JP | 2012-046182 A | 3/2012 |

OTHER PUBLICATIONS

Japanese Office Action (Preliminary Notice of Reasons for Rejection), mailed Nov. 26, 2013, Application No. 2012-234855.

* cited by examiner

Primary Examiner — John Q Nguyen
Assistant Examiner — Anshul Sood
(74) Attorney, Agent, or Firm — Sughrue Mion, PLLC

(57) ABSTRACT

In power generation control for a vehicle, which is configured to control power generation so as to reduce an amount of fuel consumed by power generation of the internal combustion engine, the vehicle including: a generator configured to be driven by the internal combustion engine to generate electric power; and the battery to be charged by the generated electric power of the generator, the vehicle being configured to stop idling at a predetermined vehicle speed or less, a battery voltage as an inter-terminal voltage of the battery is detected, and the internal combustion engine is controlled to interrupt power generation involving fuel consumption one of when the detected battery voltage reaches a predetermined combustion power generation interruption voltage and when the detected battery voltage exceeds the predetermined combustion power generation interruption voltage.

12 Claims, 4 Drawing Sheets

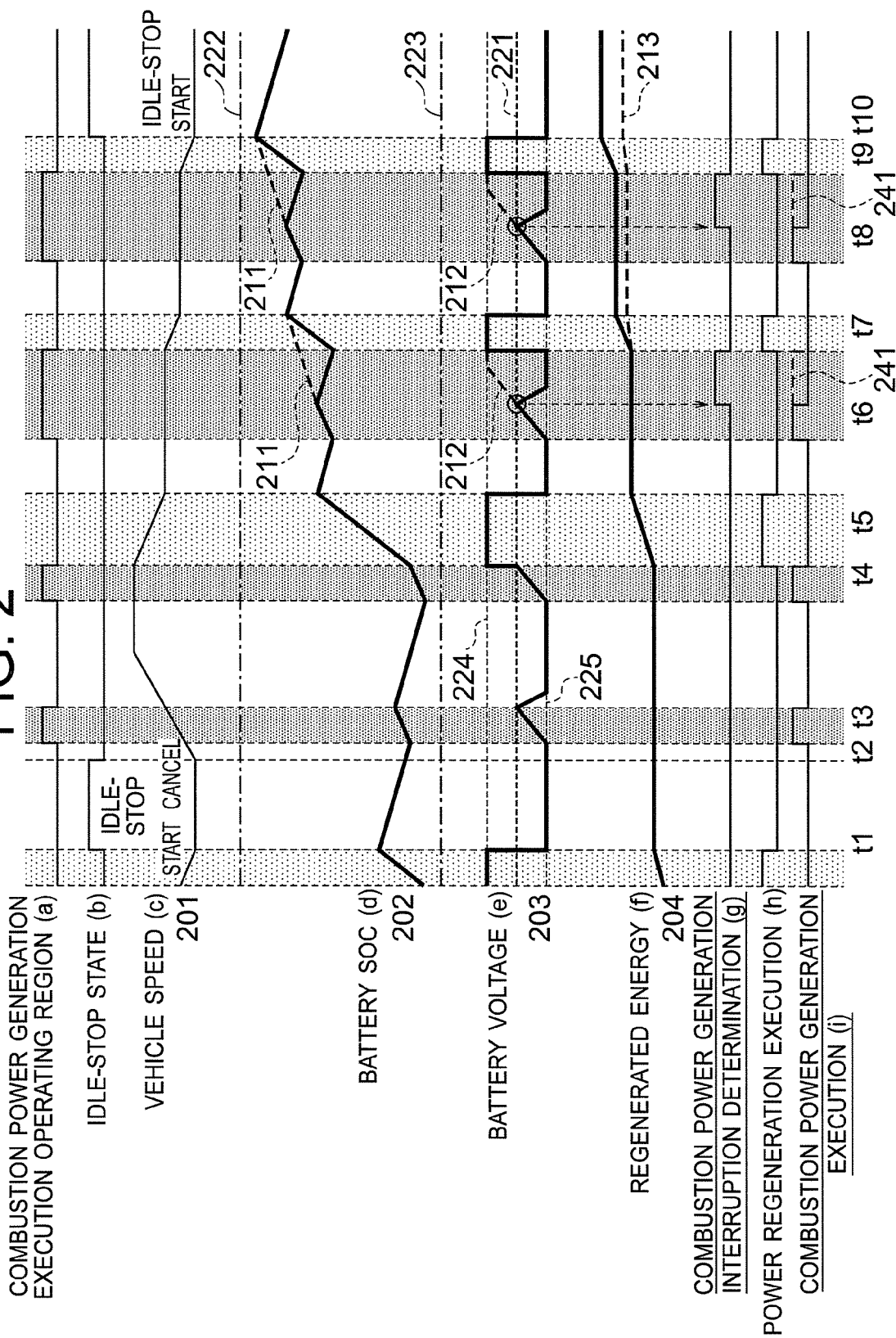

VEHICLE POWER GENERATING DEVICE AND POWER GENERATION CONTROL METHOD

BACKGROUND OF THE INVENTION

1. Field of the Invention

The present invention relates to a vehicle power generating device and the like, and more particularly, to reducing an amount of fuel consumed by power generation of an internal combustion engine.

2. Description of the Related Art

Conventionally, a vehicle mounts a generator for supplying electric power to various kinds of electric loads and charging a battery. The generator generates electric power by being driven by an internal combustion engine, and hence, when the internal combustion engine is in operation (excluding when fuel is cut off), the fuel is consumed also by the power generation.

In view of this, vehicle fuel efficiency improvement has been demanded in recent years to deal with environmental matters. There have been proposed a method of actively performing power generation when the internal combustion engine cuts off the fuel, such as when the vehicle is decelerating (hereinafter referred to as power regeneration), to thereby reduce the chance for the internal combustion engine to perform power generation involving fuel consumption (hereinafter referred to as combustion power generation), and a method of setting the operating region of the internal combustion engine as the condition for performing combustion power generation, to thereby reduce the amount of fuel consumed by power generation (see, for example, Japanese Patent No. 4158615). In the conventional technology, based on a fuel consumption map in which incremental power of the internal combustion engine obtained by power generation is added, power generation is performed in an operating region of the internal combustion engine, where fuel consumption is small, to thereby reduce the amount of fuel consumed by power generation.

The conventional technology disclosed in Japanese Patent No. 4158615, however, takes no consideration of a charged state of the battery during power generation. In particular, in the case of a generally-used lead-acid battery, the charge acceptance tends to deteriorate as the state-of-charge (hereinafter referred to as SOC) of the battery becomes higher. Thus, when the SOC of the battery becomes higher than necessary because of excessive combustion power generation, the charge acceptance in power regeneration deteriorates to reduce regenerated energy. The reduced regenerated energy is compensated for by increasing the chance of combustion power generation. As a result, there has been a problem of the increased amount of fuel consumed by power generation.

SUMMARY OF THE INVENTION

The present invention has been made to solve the conventional problem described above, and has an object to provide a vehicle power generating device and the like, which take into consideration a charged state of a battery as well as an operating region of an internal combustion engine for power generation, thus being capable of minimizing a decrease in regenerated energy caused by combustion power generation and reducing an amount of fuel consumed by power generation.

According to an exemplary embodiment of the present invention, there is provided a vehicle power generating device to be used for a vehicle configured to stop idling at a predetermined vehicle speed or less, the vehicle power generating device including: a generator configured to be driven by an internal combustion engine to generate electric power; a battery to be charged by the generated electric power of the generator; a battery state detection unit for detecting a battery voltage as an inter-terminal voltage of the battery; and a power generation control unit for controlling the internal combustion engine to interrupt power generation involving fuel consumption one of when the battery voltage detected by the battery state detection unit reaches a predetermined combustion power generation interruption voltage and when the battery voltage exceeds the predetermined combustion power generation interruption voltage.

Further, according to another exemplary embodiment of the present invention, there is provided a power generation control method for a vehicle, which is configured to control power generation so as to reduce an amount of fuel consumed by power generation of an internal combustion engine, the vehicle including: a generator configured to be driven by the internal combustion engine to generate electric power; and a battery to be charged by the generated electric power of the generator, the vehicle being configured to stop idling at a predetermined vehicle speed or less, the power generation control method including: detecting a battery voltage as an inter-terminal voltage of the battery; and controlling the internal combustion engine to interrupt power generation involving fuel consumption one of when the detected battery voltage reaches a predetermined combustion power generation interruption voltage and when the detected battery voltage exceeds the predetermined combustion power generation interruption voltage.

According to the vehicle power generating device and the power generation control method of the present invention, it is possible to provide the vehicle power generating device and the like, which take into consideration a charged state of the battery as well as the operating region of the internal combustion engine for power generation, thus being capable of minimizing a decrease in regenerated energy caused by combustion power generation and reducing an amount of fuel consumed by power generation.

BRIEF DESCRIPTION OF THE DRAWINGS

In the accompanying drawings:

FIG. 2 is a timing chart illustrating control operation of a power generation controller according to the first embodiment of the present invention;

DETAILED DESCRIPTION OF THE PREFERRED EMBODIMENT

Referring to the accompanying drawings, a vehicle power generating device and the like according to the present invention are described below by way of embodiments. In the embodiments, the same or corresponding parts are denoted by the same reference symbols, and overlapping description is omitted.

First Embodiment

Figure 1:
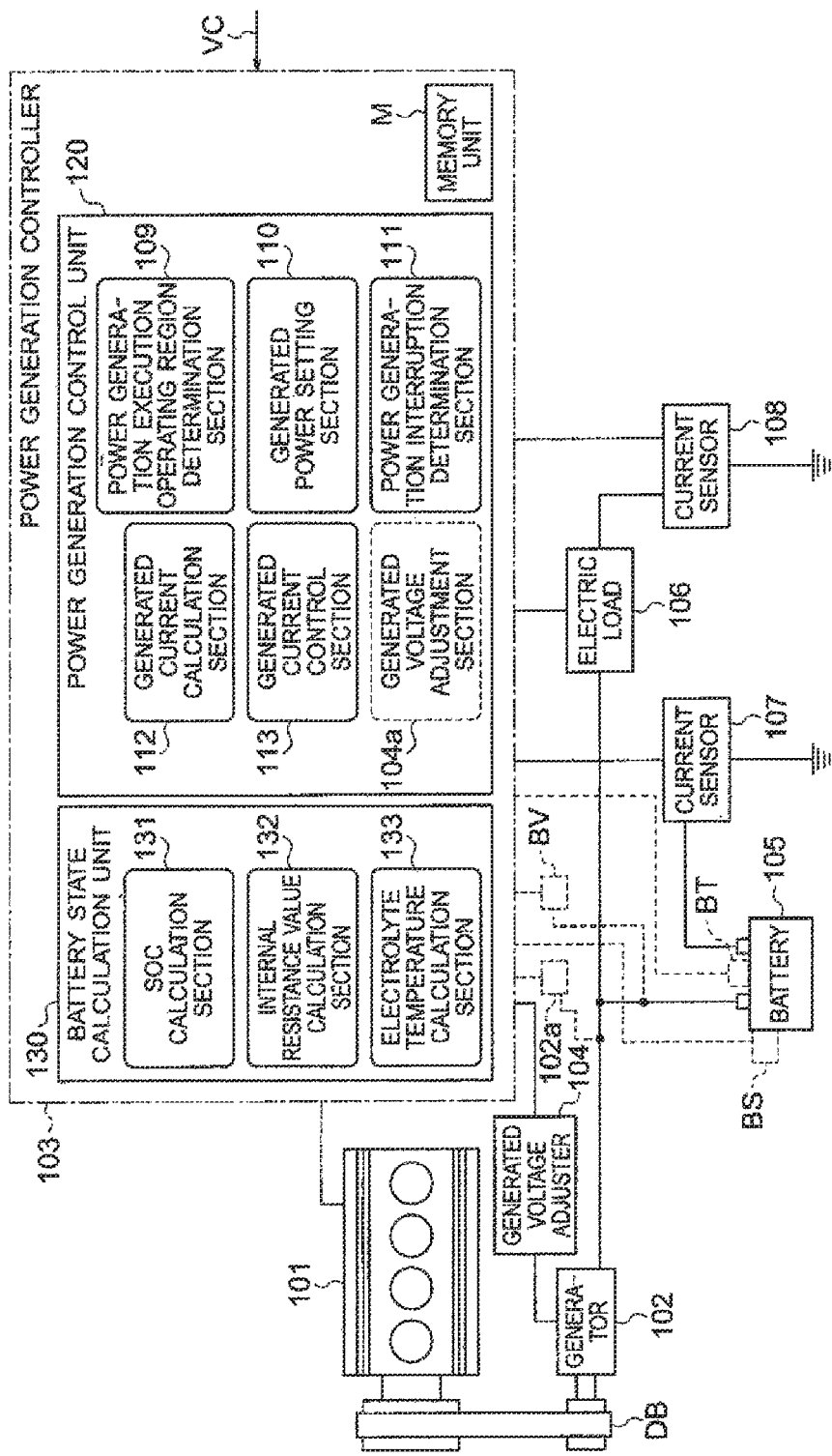
FIG. 1 is a schematic configuration diagram of an internal combustion engine equipped with a vehicle power generating device according to a first embodiment of the present invention.

FIG. 1 is a schematic configuration diagram of an internal combustion engine equipped with a vehicle power generating device according to a first embodiment of the present invention. Referring to FIG. 1, an internal combustion engine 101 drives a generator 102 via a drive belt DB, and a power generation controller 103 operates an adjustment voltage of a generated voltage adjuster 104 to control generated electric power of the generator 102. The power generation controller 103 is illustrated as a power generation control part extracted from a control apparatus (not shown) for the internal combustion engine.

The power generation controller 103 is made up of a computer. A power generation control unit 120 including a power generation execution operating region determination section 109, a generated power setting section 110, a power generation interruption determination section 111, a generated current calculation section 112, a generated current control section 113, a generated voltage adjustment section 104a, and the like and a battery state calculation unit 130 including a SOC calculation section 131, a battery internal resistance value calculation section 132, a battery electrolyte temperature calculation section 133, and the like are each illustrated as a functional block executed by a program. Various information and data used for the program and processing for executing the respective units are stored in a memory unit M.

This embodiment exemplifies the configuration including the generated voltage adjuster 104 as a configuration having higher control accuracy. As an inexpensive system, however, the power generation controller 103 may include the generated voltage adjustment section 104a inside instead of the generated voltage adjuster 104. In this case, the power generation controller 103 can directly control generated electric power of the generator 102.

Electric power generated by the generator 102 is distributed into electric power to be charged in a battery 105 and electric power to be consumed by an electric load 106 of the vehicle. A charge/discharge current of the battery 105 can be detected by a current sensor 107 mounted to a negative terminal of the battery 105. Similarly, a current consumed by the electric load 106 can be detected by a current sensor 108. The generated current of the generator 102 can be calculated by the generated current calculation section 112 of the power generation controller 103 by adding an electric load current of the vehicle obtained by the current sensor 108 to the charge current of the battery 105 obtained by the current sensor 107.

Although the configuration including the current sensors 107 and 108 is herein described, a current sensor 102a may be provided between the generator 102 and a positive terminal of the battery 105 so as to directly detect the generated current of the generator 102.

In the case of an inexpensive system without those current sensors, if the generator 102 is an alternator, the generated current calculation section 112 may calculate a generated current of the alternator based on an alternator rpm and an FR duty output in alternator control and in accordance with a map (for example, a map showing the relationship between the rpm and FR duty output and the generated current) stored in advance in the memory unit M.

In the case where the current sensor 107 is not provided, an arithmetic model (made up of a program, for example) that simulates the properties of the battery 105 may be provided in the generated current calculation section 112 so as to estimate the charge current of the battery.

In the case where the current sensor 108 is not provided, the electric load current of the vehicle may be calculated based on rated power consumption of the electric load 106 in use.

The current sensor 107, the current sensor 102a, a battery sensor BS, a voltage sensor BV for detecting the battery voltage, and other such sensors are collectively referred to as a battery state detection unit for detecting the battery state. In particular, the current sensor 107 and the current sensor 102a are collectively referred to as a battery current detection unit. The battery voltage means an inter-terminal voltage of the battery 105.

The battery state of the battery 105, such as the SOC, the internal resistance value, and the electrolyte temperature, can be determined by calculation by the battery state calculation unit 130 of the power generation controller 103 in accordance with detection results of the above-mentioned battery state detection unit. The SOC of the battery can be determined by calculation by the SOC calculation section 131. The internal resistance value of the battery can be determined by calculation by the internal resistance value calculation section 132. The electrolyte temperature of the battery can be determined by calculation by the electrolyte temperature calculation section 133. The battery state detection unit may further include a temperature sensor BT so that the electrolyte temperature of the battery may be directly detected by the temperature sensor BT.

FIG. 2 is a timing chart illustrating control operation of the power generation controller 103 of FIG. 1 according to the first embodiment of the present invention. Section (a) represents a combustion power generation execution operating region; (b), an idle-stop state; (c), the vehicle speed; (d), the battery SOC; (e), the battery voltage; (f), regenerated energy; (g), combustion power generation interruption determination; (h), power regeneration execution; and (i), combustion power generation execution.

Referring to FIG. 2, a solid line 201 indicates the vehicle speed; a solid line 202, the battery SOC as the remaining battery capacity; a solid line 203, the battery voltage; and a solid line 204, the regenerated energy. A broken line 211 indicates a battery SOC when the present invention is not applied (the conventional case where combustion power generation is not interrupted); a broken line 212, a battery voltage when the present invention is not applied (the conventional case where combustion power generation is not interrupted); and a broken line 213, regenerated energy when the present invention is not applied (the case where the battery charge acceptance deteriorates at a high SOC).

A dotted line 221 indicates a voltage at which combustion power generation is interrupted when the battery voltage exceeds this value (predetermined combustion power generation interruption voltage); a chain line 222, an upper limit SOC at which combustion power generation is interrupted when the battery SOC exceeds this value (combustion power generation execution upper limit SOC); and a chain line 223, a lower limit SOC at which combustion power generation is not interrupted when the battery SOC falls below this value (combustion power generation interruption lower limit SOC). A dotted line 224 indicates a first possible voltage of the battery 105; a dotted line 225, a second possible voltage of the battery 105; and a broken line 241, excessive power generation leading to an increase in fuel consumption. The details are described later. The battery SOC may be calculated by integrating the battery charge/discharge currents detected by the current sensor 107. Alternatively, the battery sensor BS may be provided so that the battery state is directly detected.

The power generation control unit 120 sets the combustion power generation interruption voltage indicated by the dotted line 221 in accordance with the SOC of the battery 105 determined by calculation by the battery state calculation unit 130 or the electrolyte temperature of the battery 105 detected by the battery state detection unit. The details of the combustion power generation interruption voltage are described later.

Vehicle state information to be described below includes the vehicle speed, a restart request such as the release of the brake pedal, the rpm of the internal combustion engine, and the torque (alternatively, intake air pressure or charging efficiency alternative to torque) of the internal combustion engine. Those pieces of the vehicle state information are acquired as vehicle state information VC and the like from other controllers included in the control apparatus (not shown) for the internal combustion engine.

As illustrated in FIG. 2, before time t1, the vehicle is decelerated. Power regeneration is performed together with the deceleration of the vehicle (reduction in vehicle speed). Thus, the battery voltage indicates the first voltage 224, and the SOC of the battery 105 increases.

At the time t1, an idle-stop starts at a predetermined vehicle speed or less, and at the same time, the power regeneration is finished. In the case where no power regeneration is performed, the battery voltage decreases from the first voltage 224 to indicate the second voltage 225. The first voltage 224 is a voltage command value for the case where power regeneration is performed, and is set in accordance with the properties of the battery 105 and a specified voltage of electric accessories installed in the vehicle. The second voltage 225, on the other hand, is a possible value of the battery voltage when no power generation is performed.

At time t2, the idle-stop is cancelled in response to a restart request such as the release of the brake pedal by the driver. Upon the cancellation of the idle-stop at the time t2, the internal combustion engine 101 restarts. When it is determined in a period t3 and a period t4 that the operating point of the internal combustion engine 101 falls within the combustion power generation execution operating region, the combustion power generation is performed, and hence the battery voltage increases and the SOC of the battery 105 also increases. In those periods, the battery voltage does not exceed the combustion power generation interruption voltage 221, and hence the combustion power generation interruption determination (battery voltage>combustion power generation interruption voltage) is not established. In this case, when the operating point of the internal combustion engine 101 falls within the combustion power generation execution operating region, the combustion power generation is continued.

In a subsequent period t5, power regeneration is performed together with the deceleration of the vehicle. Thus, the SOC of the battery 105 increases. In the case where power regeneration is performed, the battery voltage increases to indicate the first voltage 224.

In a period t6 and a period t8, similarly to the period t3 and the period t4, when it is determined that the operating point of the internal combustion engine 101 falls within the combustion power generation execution operating region, the combustion power generation is performed, and hence the battery voltage increases and the SOC of the battery 105 also increases. In those periods, the battery voltage exceeds the combustion power generation interruption voltage 221, and hence the combustion power generation interruption determination is established. In this case, even when the operating point of the internal combustion engine 101 falls within the combustion power generation execution operating region, the combustion power generation is interrupted. In the period t6 and the period t8, when the combustion power generation is interrupted, the battery voltage decreases to the second voltage 225 and the SOC of the battery 105 also decreases.

Further, in a period t7 and a period t9, power regeneration is performed together with the deceleration of the vehicle. Thus, the battery voltage increases to the first voltage 224, and the SOC of the battery 105 also increases.

In the case where the present invention is not applied, on the other hand, in the period t6 and the period t8, the operating point of the internal combustion engine falls within the combustion power generation execution operating region, and hence the combustion power generation is not interrupted but continued. In the period t6 and the period t8, when the combustion power generation is continued, the battery voltage increases to the first voltage 224 and the SOC of the battery 105 also increases.

Further, in the period t7 and the period t9, power regeneration is performed together with the deceleration of the vehicle. Thus, the battery voltage indicates the first voltage 224, and the SOC of the battery 105 increases. The SOC of the battery 105 after the power regeneration reaches the same SOC as that in the case where the combustion power generation continues to be interrupted in the period t6 and the period t8 (the same SOC as that in the case of the present invention).

In other words, in the case where the present invention is not applied, the following matters can be said unlike the case where the present invention is applied.

(1) In the period t6 and the period t8, excessive combustion power generation is performed, and hence fuel consumption increases, and further, the SOC of the battery 105 becomes higher than necessary because of combustion power generation.

(2) In the period t6 and the period t8, the battery voltage during power regeneration reaches the first voltage 224, and hence, when there is no potential difference, the charge amount to be charged in the battery 105 is reduced.

(3) Due to the matters (1) and (2), in the period t7 and the period t9, the battery charge acceptance (charge efficiency) during power regeneration deteriorates to reduce regenerated energy.

Therefore, in the case where the battery voltage exceeds the combustion power generation interruption voltage 221, the combustion power generation is interrupted, and hence the reduction in regenerated energy caused by the deterioration in battery charge acceptance during power regeneration can be minimized. Thus, the amount of fuel consumed by power generation can be reduced.

After time t10 at the end of the period t9, the idle-stop starts at a predetermined vehicle speed or less similarly to the time t1, and the same control operation as described above is performed.

The SOC of the battery 105 tends to increase each time the idle-stop is executed. Therefore, the combustion power generation execution upper limit SOC indicated by the chain line 222 is defined, and, when the SOC of the battery 105 exceeds this upper limit value, the execution of the combustion power generation is interrupted, thereby controlling the SOC of the battery 105 so as not to be higher than necessary because of combustion power generation.

On the other hand, in the case where the discharge amount of the battery 105 is larger than the charge amount, such as when the idle-stop is repeated in a short period of time, when the chance of power generation during running is insufficient, and when power consumption is large, the SOC of the battery 105 tends to decrease each time the idle-stop is executed. Thus, there is a fear that the SOC becomes lower than the lower use limit of the battery (the lower limit SOC causing a fear that the engine cannot be started because of the reduced battery discharge performance or that the degradation progresses). Therefore, the combustion power generation interruption lower limit SOC indicated by the chain line 223 is defined, and, when the SOC of the battery 105 falls below this lower limit value, the execution of the combustion power generation is not interrupted, thereby controlling the SOC of the battery so as not to be excessively low.

In this manner, the SOC of the battery 105 remains being equal to or lower than the combustion power generation execution upper limit SOC 222 during the vehicle running on the whole, and, when the discharge amount of the battery 105 becomes larger, combustion power generation can be performed in addition to power regeneration so as to charge the battery 105. It should be understood that the combustion power generation execution upper limit SOC 222 and the combustion power generation interruption lower limit SOC 223 can be set depending on the running state of the vehicle.

Figure 3A:
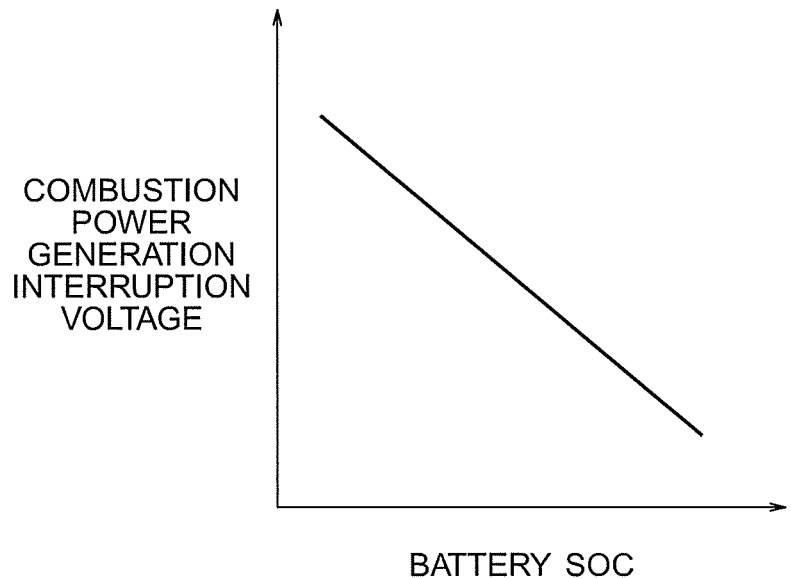
FIGS. 3A and 3B are explanatory diagrams showing an example of association between a charged state of a battery and a combustion power generation interruption voltage according to the first embodiment of the present invention.
Figure 3B:
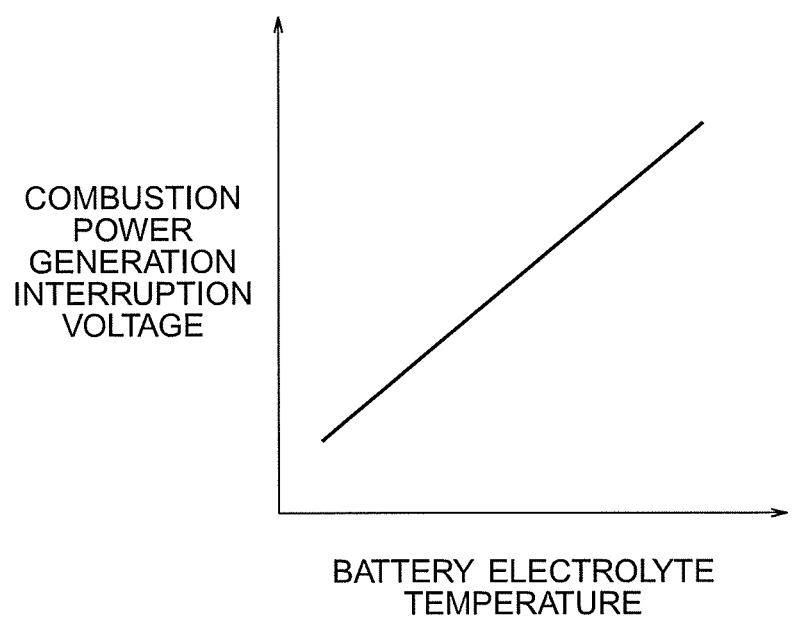

Next, the details of the above-mentioned combustion power generation interruption voltage are described with reference to the explanatory diagrams of FIGS. 3A and 3B showing an example of association between the charged state of the battery and the combustion power generation interruption voltage according to the first embodiment of the present invention. FIG. 3A shows an example of association between the SOC of the battery 105 and the combustion power generation interruption voltage. FIG. 3B shows an example of association between the electrolyte temperature of the battery 105 and the combustion power generation interruption voltage.

Regarding the setting of the combustion power generation interruption voltage, the inventor(s) of the present invention has newly found in this time that the reduction in regenerated energy caused by the degradation in battery charge acceptance during power regeneration can be minimized to reduce the amount of fuel consumed by power generation, by taking into consideration the SOC or the electrolyte temperature of the battery 105, which is a parameter responsible for the charge acceptance in power regeneration.

In other words, when the SOC of the battery 105 is taken into consideration, as the SOC of the battery 105 becomes higher, the battery charge acceptance during power regeneration becomes lower, thus leading to a fear of the reduction in regenerated energy. When the electrolyte temperature of the battery 105 is taken into consideration, as the electrolyte temperature of the battery 105 becomes lower, the battery charge acceptance during power regeneration becomes lower, thus leading to a fear of the reduction in regenerated energy.

Therefore, the power generation interruption determination section 111 included in the power generation control unit 120 sets the combustion power generation interruption voltage in consideration of those parameters, and hence the reduction in regenerated energy can be minimized. Specifically, the power generation interruption determination section 111 included in the power generation control unit 120 sets the combustion power generation interruption voltage in the following ways (1) and (2), and the combustion power generation interruption determination can be performed based on the set combustion power generation interruption voltage.

(1) Case where the power generation control unit 120 sets the combustion power generation interruption voltage in consideration of the SOC of the battery 105

A first map is defined in advance and stored in the memory unit M. As shown in FIG. 3A, in the first map, the SOC of the battery 105 and the combustion power generation interruption voltage are associated with each other so that the combustion power generation interruption voltage becomes lower as the SOC of the battery 105 becomes higher.

Further, the power generation control unit 120 sets (calculates based on the map) a combustion power generation interruption voltage corresponding to the current SOC of the battery 105 in accordance with the first map stored in the memory unit M.

In this manner, the combustion power generation can be interrupted at an earlier timing as the SOC of the battery 105 becomes higher. Thus, the reduction in regenerated energy caused by the degradation in battery charge acceptance during power regeneration can be suppressed, and the amount of fuel consumed by power generation can also be reduced.

(2) Case where the power generation control unit 120 sets the combustion power generation interruption voltage in consideration of the electrolyte temperature of the battery 105

A second map is defined in advance and stored in the memory unit M. As shown in FIG. 3B, in the second map, the electrolyte temperature of the battery 105 and the combustion power generation interruption voltage are associated with each other so that the combustion power generation interruption voltage becomes lower as the electrolyte temperature of the battery 105 becomes lower.

Further, the power generation control unit 120 sets a combustion power generation interruption voltage corresponding to the current electrolyte temperature of the battery 105 in accordance with the second map stored in the memory unit M.

In this manner, the combustion power generation can be interrupted at an earlier timing as the electrolyte temperature of the battery 105 becomes lower. Thus, the reduction in regenerated energy caused by the degradation in battery charge acceptance during power regeneration can be suppressed, and the amount of fuel consumed by power generation can also be reduced.

As described above, the power generation control unit 120 can set the combustion power generation interruption voltage in accordance with the first map or the second map. Thus, when the battery voltage has exceeded the set combustion power generation interruption voltage, even if the operating point of the internal combustion engine 101 falls within the combustion power generation execution operating region, the combustion power generation is interrupted.

The association between the SOC of the battery 105 and the combustion power generation interruption voltage in the first map shown in FIG. 3A and the association between the electrolyte temperature of the battery 105 and the combustion power generation interruption voltage in the second map shown in FIG. 3B both have a linear change. The present invention, however, is not limited thereto. In other words, FIGS. 3A and 3B are merely an example of the first map and the second map, and those associations may have any change such as a change with a curve.

In the case of setting the combustion power generation interruption voltage, the power generation control unit 120 can select one of the first map and the second map as appropriate.

Alternatively, a third map may be defined in advance and stored in the memory unit M. In the third map, both parameters of the SOC and the electrolyte temperature of the battery 105 are associated with the combustion power generation interruption voltage. In this case, the power generation control unit 120 sets the combustion power generation interruption voltage in accordance with the third map stored in the memory unit M.

It is preferred that the power generation control unit 120 set the combustion power generation interruption voltage in accordance with the first map, the second map, or the third map and perform the combustion power generation interruption determination. Alternatively, however, the power generation control unit 120 may perform the combustion power generation interruption determination based on a predefined combustion power generation interruption voltage having a fixed value.

Figure 4:
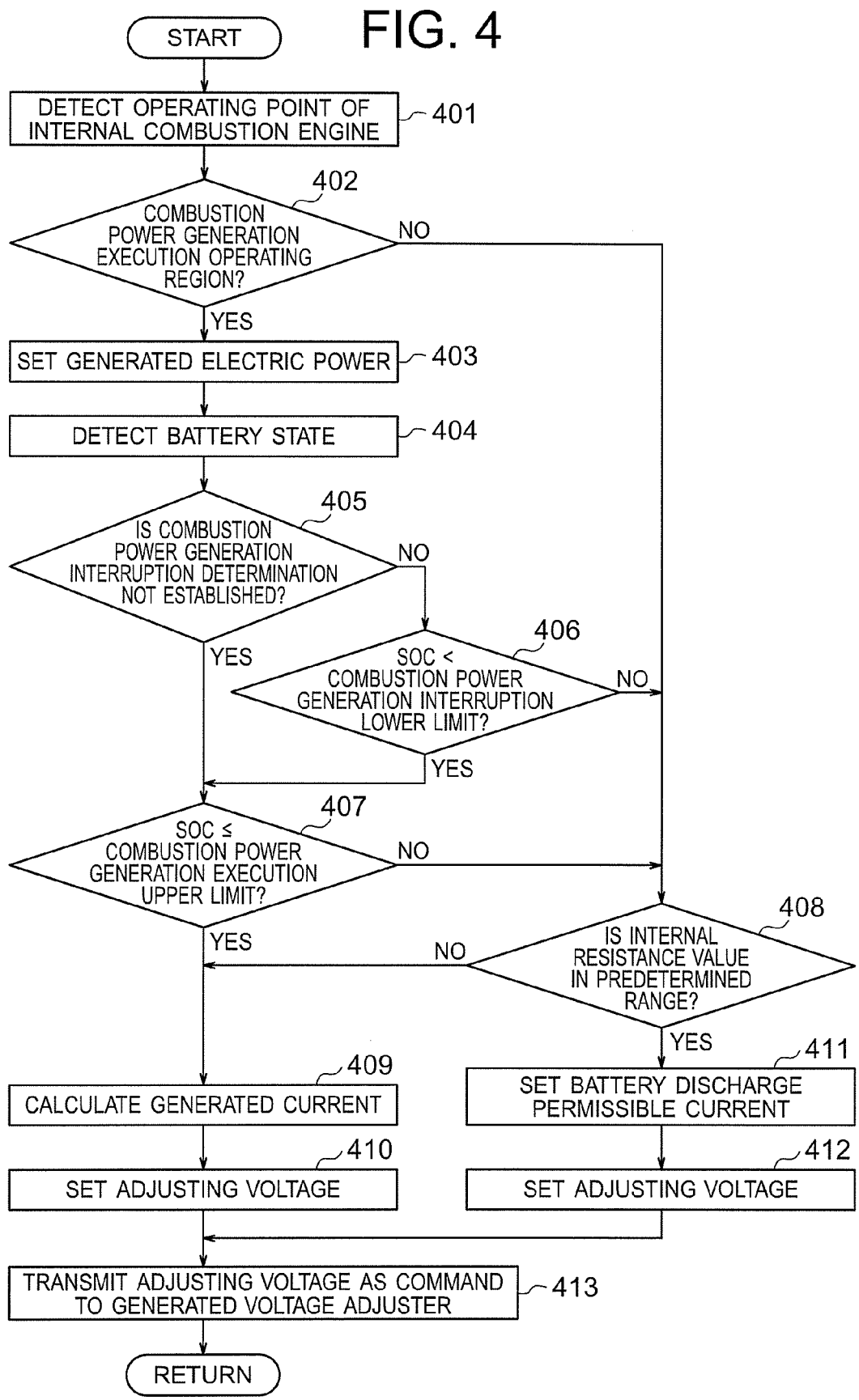
FIG. 4 is a flowchart illustrating processing of executing combustion power generation performed by the power generation controller according to the first embodiment of the present invention.

FIG. 4 is a flowchart illustrating processing of executing combustion power generation performed by the power generation controller according to the first embodiment of the present invention. The combustion power generation execution processing is performed at a predetermined arithmetic cycle (such as 100 msec). Referring to FIG. 4, in Step 401, the rpm and torque (alternatively, intake air pressure or charging efficiency alternative to torque) are detected as the operating point of the internal combustion engine (for example, acquired as vehicle state information VC from the internal combustion engine controller). Then, the processing proceeds to Step 402. In Step 402, when the operating point of the internal combustion engine falls within, for example, a predetermined combustion power generation execution operating region which is set and stored in the memory unit M in advance, the processing proceeds to Step 403. In Step 403, a generated current target value is calculated based on a map in accordance with the rpm and the generated voltage of the generator 102. Generated electric power is set by multiplying the generated voltage by the generated current target value. The rpm of the generator 102 is determined by multiplying the rpm of the internal combustion engine 101 (based on vehicle state information VC) by the pulley ratio. The generated voltage is calculated by adding a voltage corresponding to wiring resistance to the generator 102 to the battery voltage. The battery voltage is detected by the voltage sensor BV, and the wiring resistance is stored in the memory unit M in advance. Then, the processing proceeds to Step 404.

In Step 404, the SOC, the internal resistance value, and the electrolyte temperature are detected as the battery state, and the processing proceeds to Step 405. The SOC and the internal resistance value of the battery may be calculated based on the charge/discharge current of the battery and the battery voltage, or alternatively, the battery sensor BS may be provided so as to directly detect the battery state. The electrolyte temperature of the battery may be calculated with the use of an arithmetic model based on a charge/discharge history of the battery, or alternatively, the temperature sensor BT may be provided so as to directly detect the electrolyte temperature of the battery.

In Step 405, when the combustion power generation interruption determination is not established, that is, until the battery voltage exceeds the combustion power generation interruption voltage (in FIG. 2, until the battery voltage exceeds the combustion power generation interruption voltage in the period t6 and the period t8), the processing proceeds to Step 407. In Step 405, when the combustion power generation interruption determination is established, the processing proceeds to Step 406. In Step 406, when the SOC of the battery 105 is smaller than the combustion power generation interruption lower limit SOC, there is a fear that the engine cannot be started because of the reduced discharge performance or that the degradation progresses, and hence the processing proceeds to Step 407 in order to charge the battery 105 without interrupting the combustion power generation. In Step 407, when the battery SOC is equal to or smaller than the combustion power generation execution upper limit SOC, that is, when the battery SOC falls within the range where the regenerated energy of the combustion power generation is less reduced, the execution of the combustion power generation is permitted. Then, the processing proceeds to Step 409.

When the operating point of the internal combustion engine in Step 402 is out of the combustion power generation execution operating region, when the combustion power generation interruption determination is established in Step 405 and the battery SOC is equal to or larger than the combustion power generation interruption lower limit SOC in Step 406, or when the battery SOC exceeds the combustion power generation execution upper limit SOC in Step 407, the processing proceeds to Step 408. In Step 408, when the internal resistance value of the battery 105 falls within a predetermined range, it is determined that it is unnecessary to execute combustion power generation. Then, the processing proceeds to Step 411. In Step 408, when the internal resistance value of the battery 105 falls out of the predetermined range, there is a fear of reduction in startup performance or progress in degradation, and hence the execution of the combustion power generation is permitted in order to charge the battery 105. Then, the processing proceeds to Step 409.

In Step 409, an electric load current of the electric load 106 of the vehicle is added to the charge current of the battery 105, to thereby calculate a generated current instantaneous value of the generator 102. Then, the processing proceeds to Step 410. In Step 410, a voltage set value as a command to the generated voltage adjuster 104 is output based on a deviation between the generated current target value calculated based on the map in Step 403 and the generated current instantaneous value calculated in Step 409. Then, the processing proceeds to Step 413.

In Step 411, a discharge permissible current is set so that the battery 105 may not be excessively discharged because of no execution of the combustion power generation. Then, the processing proceeds to Step 412. In Step 412, a voltage set value as a command to the generated voltage adjuster 104 is output based on a deviation between the discharge permissible current and a discharge current (having the opposite sign to the charge current) of the battery 105. Then, the processing proceeds to Step 413. This embodiment exemplifies a discharge method to be performed when there is no abnormality in the usage state and degradation degree of the battery 105 and when the vehicle power generating device is in normal operation. However, if some abnormality is detected by other sections, the processing may forcibly proceed to Step 409 in Step 408, or the charge current of the battery 105 may be set in Step 411 so that the battery may forcibly be charged in the subsequent step.

In Step 413, an adjustment voltage based on the voltage set value that is set in Step 410 or 412 is transmitted as a command to the generated voltage adjuster 104, thus finishing the current processing.

Note that, Steps 401 and 402 are executed by the power generation execution operating region determination section 109, Step 403 is executed by the generated power setting section 110, Step 404 is executed by the battery state calculation unit 130, Steps 405 to 407 and 408 are executed by the power generation interruption determination section 111, Step 409 is executed by the generated current calculation section 112, and Steps 410 to 413 are executed by the generated current control section 113.

Through the above-mentioned series of processing, combustion power generation can be performed by the internal combustion engine 101 in a predetermined operating region and at predetermined generated electric power until the battery voltage exceeds the combustion power generation interruption voltage. In the case where the combustion power generation is not performed, the battery 105 can be discharged within a permissible current range.

In the above description, combustion power generation is interrupted when the battery voltage has exceeded the combustion power generation interruption voltage. Alternatively, however, combustion power generation may be interrupted when the battery voltage has reached (become equal to) the combustion power generation interruption voltage.

Although only the control processing on the generator side has been exemplified in this embodiment, a change in vehicle drive torque caused by combustion power generation can be dealt with control processing on the internal combustion engine side. Specifically, the amount of torque corresponding to the generated energy is compensated for by changing the throttle opening degree or the ignition timing. Thus, the feeling of discomfort to a driver can be prevented.

According to the vehicle power generating device in the first embodiment of the present invention described above, the charged state of the battery as well as the operating region of the internal combustion engine for power generation is taken into consideration. Thus, combustion power generation can be interrupted when the battery voltage exceeds a combustion power generation interruption voltage, and after that, the internal combustion engine does not perform excessive power generation involving fuel consumption. Therefore, it is possible to minimize the decrease in regenerated energy caused by combustion power generation, thus reducing the amount of fuel consumed by power generation.

The vehicle power generating device according to the present invention is applicable to an internal combustion engine controller for various kinds of vehicle, and similar effects can be obtained.

What is claimed is:

1. A vehicle power generating device for use in a vehicle configured to stop idling at or below a predetermined vehicle speed, the vehicle power generating device comprising:
   a generator configured to be driven by an internal combustion engine to generate electric power;
   a battery configured to be charged by the generated electric power of the generator;
   a battery state detection unit configured to detect a battery voltage as an inter-terminal voltage of the battery; and
   a power generation control unit configured to control the internal combustion engine to interrupt power generation involving fuel consumption when the battery voltage detected by the battery state detection unit reaches or exceeds a predetermined combustion power generation interruption voltage in response to a determination that regenerative power is not being generated.

2. A vehicle power generating device according to claim 1, wherein:
   the battery state detection unit is further configured to detect a charged state of the battery;
   the vehicle power generating device further comprises a SOC calculation section configured to calculate a state-of-charge of the battery based on the charged state of the battery detected by the battery state detection unit; and
   the power generation control unit is configured to set the combustion power generation interruption voltage to correspond to a current state-of-charge of the battery based on a predefined first map in which the state-of-charge of the battery is associated with the combustion power generation interruption voltage.

3. A vehicle power generating device according to claim 1, wherein:
   the battery state detection unit is further configured to detect a charged state of the battery;
   the vehicle power generating device further comprises an electrolyte temperature calculation section for calculating an electrolyte temperature of the battery based on the charged state of the battery detected by the battery state detection unit; and
   the power generation control unit is configured to set the combustion power generation interruption voltage to correspond to a current electrolyte temperature of the battery based on a predefined second map in which the electrolyte temperature of the battery is associated with the combustion power generation interruption voltage.

4. A vehicle power generating device according to claim 1, wherein:
   the battery state detection unit is further configured to detect an electrolyte temperature of the battery; and
   the power generation control unit is configured to set the combustion power generation interruption voltage to correspond to a current electrolyte temperature of the battery based on a predefined second map in which the electrolyte temperature of the battery is associated with the combustion power generation interruption voltage.

5. A vehicle power generating device according to claim 1, wherein:
   the battery state detection unit is further configured to detect a charged state of the battery;
   the vehicle power generating device further comprises:
      a SOC calculation section configured to calculate a state-of-charge of the battery based on the charged state of the battery detected by the battery state detection unit; and
      an electrolyte temperature calculation section configured to calculate an electrolyte temperature of the battery based on the charged state of the battery; and
   the power generation control unit is configured to set the combustion power generation interruption voltage to correspond to a current state-of-charge of the battery and a current electrolyte temperature of the battery based on a predefined third map in which the state-of-charge of the battery and the electrolyte temperature of the battery are associated with the combustion power generation interruption voltage.

6. A vehicle power generating device according to claim 1, wherein:
   the battery state detection unit is further configured to detect a charged state of the battery and an electrolyte temperature of the battery;
   the vehicle power generating device further comprises a SOC calculation section for calculating a state-of-charge of the battery based on the charged state of the battery detected by the battery state detection unit; and
   the power generation control unit is configured to set the combustion power generation interruption voltage to correspond to a current state-of-charge of the battery and a current electrolyte temperature of the battery based on a predefined third map in which the state-of-charge of the battery and the electrolyte temperature of the battery are associated with the combustion power generation interruption voltage.

7. A vehicle power generating device according to claim 1, wherein:
   the battery state detection unit is further configured to detect a charged state of the battery;
   the vehicle power generating device further comprises a SOC calculation section for calculating a state-of-charge of the battery based on the charged state of the battery detected by the battery state detection unit; and
   when the state-of-charge of the battery exceeds a predetermined upper limit value, the power generation control unit is configured to control the internal combustion engine to interrupt the power generation involving fuel consumption.

8. A vehicle power generating device according to claim 1, wherein:
- the battery state detection unit is further configured to detect a charged state of the battery;
- the vehicle power generating device further comprises a SOC calculation section for calculating a state-of-charge of the battery based on the charged state of the battery detected by the battery state detection unit; and
- when the state-of-charge of the battery is lower than a predetermined lower limit value, the power generation control unit is configured to control the internal combustion engine to continue the power generation involving fuel consumption.

9. A vehicle power generating device according to claim 1, wherein:
- the battery state detection unit is further configured to detect a charged state of the battery;
- the vehicle power generating device further comprises an internal resistance value calculation section for calculating an internal resistance value of the battery based on the charged state of the battery detected by the battery state detection unit; and
- when the internal resistance value of the battery falls out of a predetermined range, the power generation control unit is configured to control the internal combustion engine to continue the power generation involving fuel consumption.

10. The vehicle power generating device according to claim 1, wherein the battery is charged regardless of the predetermined combustion power generation interruption voltage while the regenerative power is being generated.

11. A power generation control method for a vehicle, which is configured to control power generation so as to reduce an amount of fuel consumed by power generation of an internal combustion engine,
- the vehicle including: a generator configured to be driven by the internal combustion engine to generate electric power; and a battery to be charged by the generated electric power of the generator,
    - the vehicle being configured to stop idling at a predetermined vehicle speed or less,
- the power generation control method comprising:
    - detecting a battery voltage as an inter-terminal voltage of the battery; and
    - controlling the internal combustion engine to interrupt power generation involving fuel consumption when the detected battery voltage reaches or exceeds a predetermined combustion power generation interruption voltage in response to a determination that regenerative power is not being generated.

12. The vehicle power generating device according to claim 10, wherein a voltage of the battery increases higher than the predetermined combustion power generation interruption voltage while the regenerative power is being generated.

* * * * *